June 24, 1930. U. J. BOEHNKE 1,765,647
ROTARY CONVEYER AND WASHER FOR VEGETABLES AND FRUITS
Filed Feb. 23, 1929 2 Sheets-Sheet 2
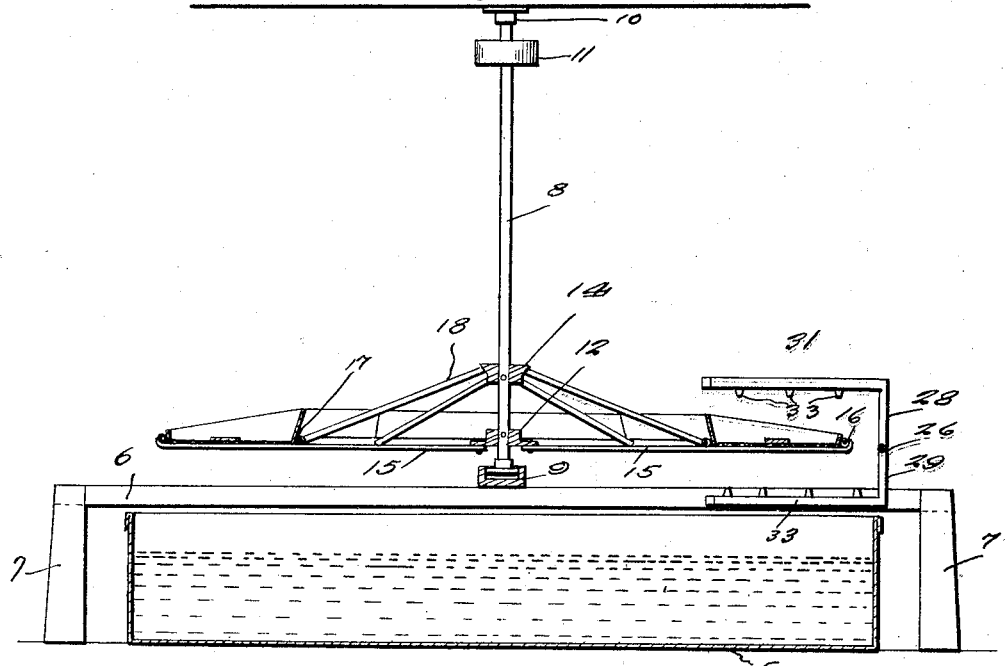
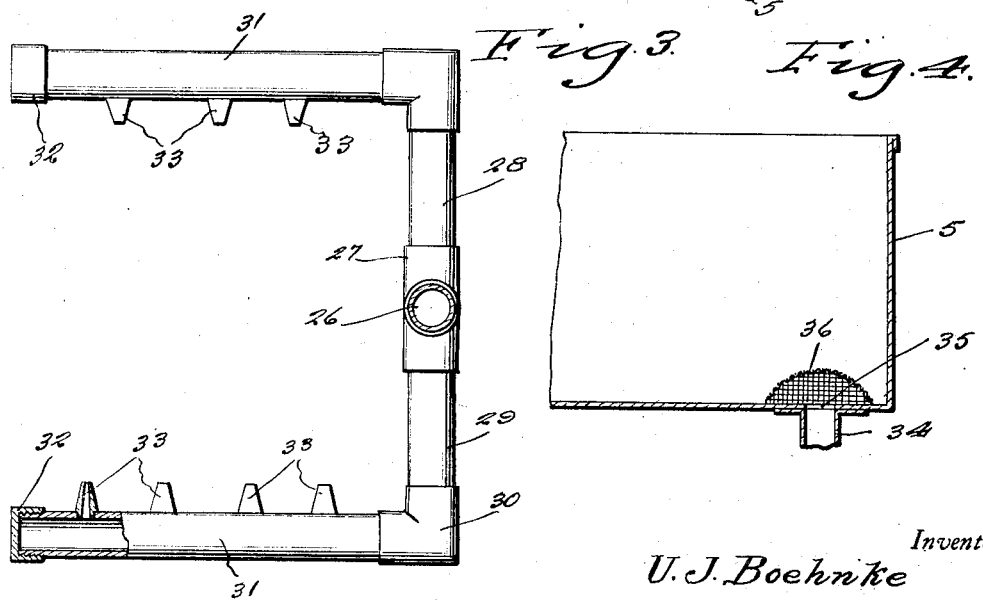
Inventor
U. J. Boehnke
By Clarence A. O'Brien
Attorney Patented June 24, 1930

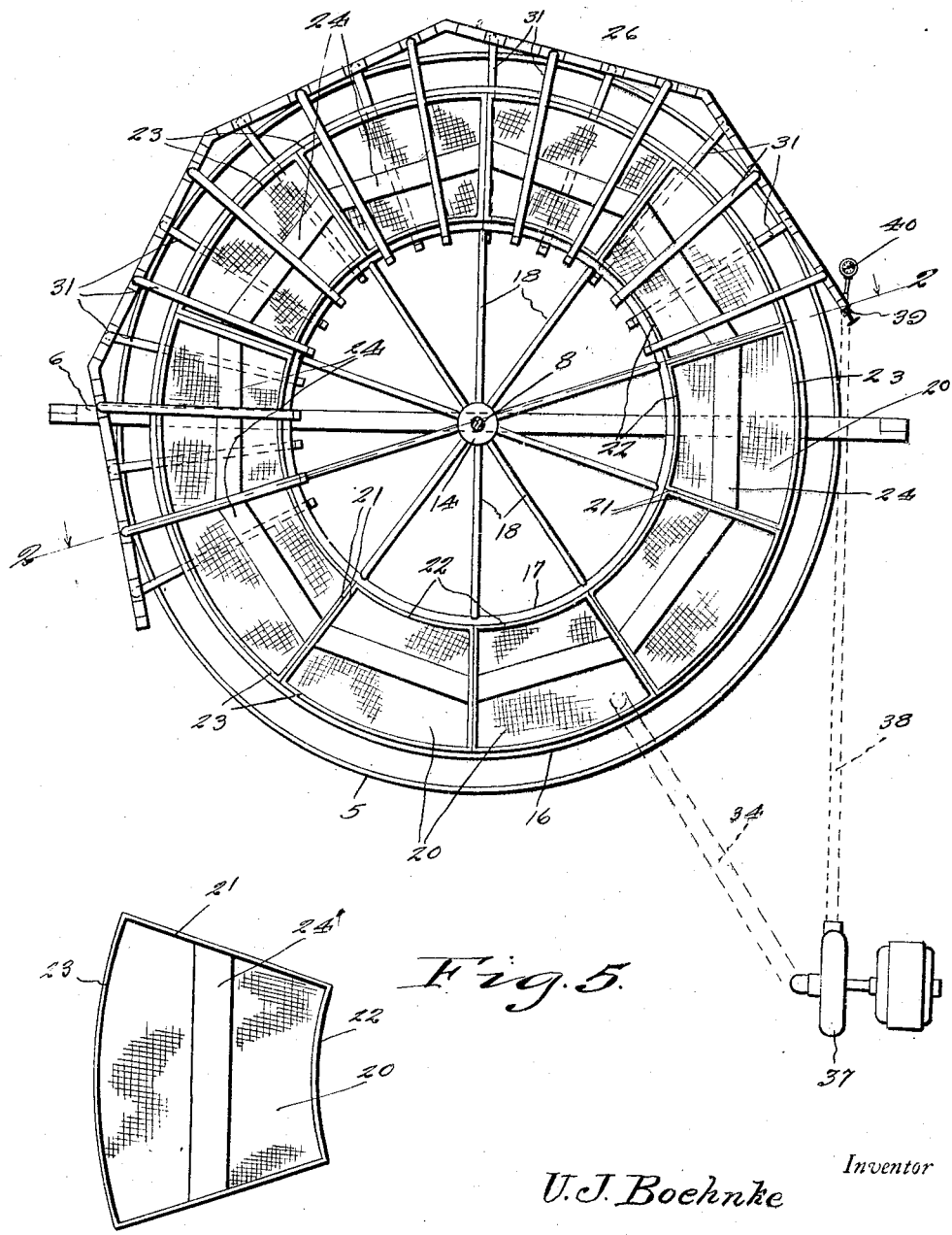

1,765,647

UNITED STATES PATENT OFFICE

ULRICH J. BOEHNKE, OF SAN JUAN, TEXAS

ROTARY CONVEYER AND WASHER FOR VEGETABLES AND FRUITS

Application filed February 23, 1929. Serial No. 342,081.

The present invention relates to a rotary conveyer and washer for vegetables and fruits and has for its prime object to provide a rotary structure for conveying fruit or vegetables to be washed through a spray and then to a position whereby they may be taken from the conveyor without injury and placed in the shipping boxes, crates, baskets or the like.

A still further very important object of the invention resides in the provision of a novel rotary conveyer including a plurality of baskets having foraminous bottoms, said baskets being removable and replaceable in respect to the rotary conveyer.

A still further very important object of the invention resides in the provision of an apparatus of this nature which is exceedingly simple in its construction, inexpensive to manufacture, strong and durable, compact and convenient in its arrangement of parts, thoroughly efficient and reliable in use and operation, and otherwise well adapted to the purpose for which it is desired.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus embodying the features of my invention, Figure 2 is a vertical section therethrough taken substantially on the line 2—2 of Figure 1, Figure 3 is an enlarged detail section through the spraying apparatus, Figure 4 is an enlarged detail section through the tank, and Figure 5 is a plan view of one of the baskets.

Referring to the drawings in detail it will be seen that the numeral 5 denotes a round open top tank in which is a quantity of fruit or vegetable spraying liquid solution.

A bar 6 is disposed diametrically across the top of the tank 5 and is supported on the standard 7. A shaft 8 is journaled in a bearing 9 at the center of the bar 6 and rises therefrom and is journaled in a bearing 10 at the ceiling or the like. A pulley 11 is fixed to the upper portion of the shaft 8 so that the same may be driven by belt power or in any other suitable manner.

A hub 12 and a hub 14 are mounted on the shaft 8 the latter a spaced distance above the former. A plurality of spokes 15 radiate outwardly from the hub 12 in a horizontal plane.

A ring 16 is fixed to the outer ends of the spokes 15. A ring 17 is fixed to intermediate portions of the spokes 15 concentrically with respect to the ring 16. Spokes 18 radiate from the hub 14 and incline outwardly and downwardly to the ring 17.

A plurality of baskets are removably mounted on the rotary conveyer thus formed between the rings 17 and 16. Each basket includes a foraminous body 20 having straight side walls 21 obliquely disposed in respect to each other to converge toward each other inwardly and merge into a longitudinally inclined curved inner wall 22 while the outer ends merge into a longitudinally curved inclined outer wall 23. The inner and outer walls 22 and 23 of the basket engage on the adjacent portions of the inner and outer rings, as clearly illustrated in Figure 2 of the drawings.

A strip of suitable smooth material 24 is disposed along the central portions of the bottom 20 so that a person may slide the hand along the bottom without the finger nails or the like catching in the mesh of the foraminous bottom and this is useful in removing the fruit.

A spraying apparatus is disposed about approximately one-half of the circular rotating conveyer just described and includes a plurality of pipe sections 26 with couplings 27 therebetween so as to connect with the sections 26 upwardly extending branches 28 and downwardly extending branches 29.

Elbows 30 are on the extremities of the branches 28 and 29 to support tubes 31 closed at their ends by caps 32 and having nozzles 33 extending therefrom. The nozzles of the lower tubes 31 extend upwardly while the nozzles of the upper tubes extend downwardly.

The tubes 31 are disposed above and below the conveyer with its basket in offset arrangement as is clearly illustrated in Figure 1 and the solution sprayed by this spraying apparatus will be allowed to drain back into the tank 5.

The solution from the tank 5 is pumped through a pipe 34 from an opening 35 in the bottom of the tank 5 over which is disposed a strainer 36, by means of a pump 37 and then through a pipe 38 in one end of one of the end sections 26, and which may be controlled by a valve 39 and a pressure gage 40 may be used at this point.

From the above description it will be seen that as the rotary conveyer slowly moves around the fruit in the basket will be thoroughly sprayed and workmen may pick the fruit out of the basket or the baskets themselves may be removed if so desired, and of course other workmen may fill the basket or replace the removed baskets.

It is preferable to remove the fruit from the basket rather than to remove the basket. The baskets are made removable more for repair purposes and for necessary cleaning which should be done at intervals.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, an open top round tank, a bar across the tank, a shaft journaled on the bar to ride upwardly therefrom centrally of the tank, a rotary conveyer on the shaft, and sprinkling means about a portion of the rotary conveyer, said rotary conveyer including a pair of vertically spaced hubs on the shaft, spokes radiating from the lower hub, a ring on the outer ends of the spokes, a ring on the intermediate portion of the spokes, spokes extending from the inner ring in the upper hub, and removable baskets resting on the spokes between the rings.

2. In an apparatus of the class described, an open top round tank, a bar across the tank, a shaft journaled on the bar to ride upwardly therefrom centrally of the tank, a rotary conveyer on the shaft, and sprinkling means about a portion of the rotary conveyer, said rotary conveyer including a pair of vertically spaced hubs on the shaft, spokes radiating from the lower hub, a ring on the outer ends of the spokes, a ring on the intermediate portion of the spokes, spokes extending from the inner ring in the upper hub, and removable baskets resting on the spokes between the rings having longitudinally curved inner and outer walls engaged on the adjacent portion of the rings, each basket including a foraminous bottom.

3. In an apparatus of the class described, an open top round tank, a bar across the tank, a shaft journaled on the bar to ride upwardly therefrom centrally of the tank, a rotary conveyer on the shaft, and sprinkling means about a portion of the rotary conveyer, said rotary conveyer including a pair of vertically spaced hubs on the shaft, spokes radiating from the lower hub, a ring on the outer ends of the spokes, a ring on the intermediate portion of the spokes, spokes extending from the inner ring in the upper hub, and removable baskets resting on the spokes between the rings having longitudinally curved inclined front and rear walls engaged on the adjacent portion of the rings, each basket including a foraminous bottom, a smooth strip across a portion of the bottom.

4. In an apparatus of the class described, an open top round tank, a bar across the tank, a shaft journaled on the bar to ride upwardly therefrom centrally of the tank, a rotary conveyer on the shaft, and sprinkling means about a portion of the rotary conveyer, said rotary conveyer including a pair of vertically spaced hubs on the shaft, spokes radiating from the lower hub, a ring on the outer ends of the spokes, a ring on the intermediate portion of the spokes, spokes extending from the inner ring in the upper hub, and removable baskets resting on the spokes between the rings having longitudinally curved inclined inner and outer walls engaged on the adjacent portion of the rings, each basket including a foraminous bottom, a smooth strip across a portion of the bottom, each sprinkler comprising a pipe with upwardly and downwardly extending branches extending from the branches to come over and to come under the rotary conveyer and nozzles projecting from the tubes toward the conveyer.

In testimony whereof I affix my signature.

ULRICH J. BOEHNKE.